United States Patent
Melendez et al.

(10) Patent No.: US 6,635,919 B1
(45) Date of Patent: Oct. 21, 2003

(54) HIGH Q-LARGE TUNING RANGE MICRO-ELECTRO MECHANICAL SYSTEM (MEMS) VARACTOR FOR BROADBAND APPLICATIONS

(75) Inventors: Jose L. Melendez, Plano, TX (US); Tsen-Hwang Lin, Dallas, TX (US); Byron Williams, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/640,410

(22) Filed: Aug. 17, 2000

(51) Int. Cl.$^7$ .................. H01L 27/108; H01L 29/93
(52) U.S. Cl. .................. 257/312; 257/595; 257/600; 438/50; 438/52; 438/53; 200/181; 200/600
(58) Field of Search .................. 438/379, 50, 52, 438/53; 257/312, 595, 600, 602, 618, 619, 621; 200/181, 600; 333/101, 108, 262; 73/715, 718, 724; 361/277, 278, 280, 281

(56) References Cited

U.S. PATENT DOCUMENTS 5,619,061 A    4/1997  Goldsmith et al. ......... 257/528

OTHER PUBLICATIONS

Z. Jamie Yao et al., "Micromachined Loe–Loss Microwave Switches", IEEE J. of. Microelectromechanical systems, vol. (8), Jun. 2, 1999, pp 129–134.*

N. Scott Barker et al., "Distributed MEMS True–Time Delay Phase Shifters and Wide–Band Switches", IEEE Tran. on Microwave Theory and Techniques, vol. 46, No. 11, Nov. 1998, pp 1881–1890.*

Goldsmith et al., Micromechanical Membrane Switches for Microwave Applications, IEEE Microwave Theory Technology Symposium Digest, pp. 91–94, Apr., 1995.

Goldsmith et al., Characteristics of Micromachined Switches at Microwave Frequencies, IEEE Microwave Theory Technology Symposium Digest, pp. 1141–1144, 1996.

Randall et al.,Fabrication of Micromechanical Switches for Routing Radio Frequency Signals, American Vacuum Society Publ. 3692, J. Van. Sci. Technol. B 14(6), Nov./Dec. 1996.

Dec et al., Electro–Mechanical Properties of a Micromachined Varactor With a Wide Tuning Range, IEEE Microwave Theory Technology Symposium Digest, vol. IV, pp. 369–371, Mar., 1998.

Fan et al., Universal MEMS Platforms for Passive RF Components: Suspended Inductors and Variable Capacitors, IEEE Microwave Theory Technology Symposium Digest, vol. 1, pp. 29–33, 1998.

Clark et al., Micromechanical Devices for Wireless Communications (invited plenary) Proceedings, 1998 IEEE International Workshop on Micro Electro Mechanical Systems, Heidelberg, Germany, pp. 1–7, Jan. 25–29, 1998.

Wu et al., MEMS Designed for Tunable Capacitors, IEEE Microwave Theory Technology Symposium Digest, pp. 127–129, May, 1998.

* cited by examiner

Primary Examiner—Steven Loke
Assistant Examiner—Donghee Kang
(74) Attorney, Agent, or Firm—W. Daniel Swayze, Jr.; W. James Brady; Frederick J. Telecky, Jr.

(57) ABSTRACT

A Micro Electro-Mechanical System (MEMS) varactor (100, 200) having a bottom electrode (116) formed over a substrate (112) and a dielectric material (130) disposed over the bottom electrode (116). A pull-down electrode (122) is formed over spacer (120) and the dielectric material (130). The MEMS varactor (100, 200) is adapted to operate in a stiction mode, with at least a portion of pull-down electrode (122) in contact with dielectric material (130). The MEMS varactor (100, 200) has a high Q, large tuning range, and high sensitivity.

14 Claims, 2 Drawing Sheets

HIGH Q-LARGE TUNING RANGE MICRO-ELECTRO MECHANICAL SYSTEM (MEMS) VARACTOR FOR BROADBAND APPLICATIONS

TECHNICAL FIELD

This invention relates generally to integrated circuits, and more particularly to Micro Electro-Mechanical System (MEMS) devices.

BACKGROUND OF THE INVENTION

In the telecommunications industry, the demand for lightweight portable devices such as personal computing devices, Personal Digital Assistants (PDA's) and cellular phones has driven designers to reduce the size of existing components. A Q value is a ratio of the power stored in a device to the dissipated power in a device. Due to the need for Q values beyond the capabilities of conventional IC technologies, board-level passive components continue to occupy a substantial portion of the overall area in transceivers of handheld telecommunications equipment, presenting a bottleneck against further miniaturization. For example, discrete components currently occupy approximately 50% of the space in cellular phones.

Recently MEMS devices including resonators, filters, and switches have been developed that offer an alternative set of strategies for transceiver miniaturization and improvement. MEMS devices are high-Q, chip-level, lower power replacements for board-level components that greatly decrease space and area requirements.

One such MEMS device is an RF switch for switching RF signals, shown in a cross-sectional view in FIG. 1. RF drumhead capacitive MEMS switch 10, disclosed by Goldsmith et al. in U.S. Pat. No. 5,619,061, comprises an insulator 14 such as $SiO_2$ deposited over a substrate 12, which may comprise silicon, for example. A bottom electrode 16 is formed on insulator 14 and a dielectric 18 is formed over bottom electrode 16. Capacitor dielectric 18 typically comprises $Si_3N_4$, $Ta_2O_5$ or other suitable dielectric materials, for example. An active element comprising a thin metallic membrane 22 is suspended away from electrode 16 by an insulating spacer 20. Membrane 22 which serves as a top electrode is movable through the application of a DC electrostatic field between membrane 22 and bottom electrode 16. Membrane 22, dielectric 18 and bottom electrode 16 comprise a metal-dielectric-metal capacitor when the MEMS switch 10 is in the "on" position, shown in FIG. 2. In the "off" position shown in FIG. 1, with no voltage applied to membrane 22 and bottom electrode 16, the capacitance value is at a minimum. MEMS switches 10 have low insertion loss, good isolation, high power handling, and very low switching and static power requirements.

A MEMS switch 10 may be designed for use as a varactor. A varactor is a discrete electronic component, usually comprising a P-N junction semiconductor, designed for microwave frequencies, in which the capacitance varies with the applied voltage. Varactors are sometimes referred to as tunable capacitors. Varactors are used in frequency up and down conversion in cellular phone communication, for example. Existing varactors are usually p-n diodes specifically designed for operation in the reverse bias regimes where the capacitance($C_J$) of the depletion region is varied to set frequency ($\omega_0$) of operation as reflected in Equation 1:

$$\omega_0 \approx 1/(C_J * R_S * R_P)^{1/2} \quad \text{Equation 1:}$$

where resistances $R_P$ and $R_S$ are the parallel and series resistances of the diode, respectively. Some primary requirements of a varactor are that it have a high quality factor (Q) for increased stability to thermal variations and noise spikes, and a large linear tuning range (TR). High-performing varactors are usually made of GaAs. Unfortunately, these devices use a different processing technology that is not amenable to integration into standard Si-CMOS process.

MEMS devices offer a means by which high Q large tuning range varactors can be integrated in higher level devices such as voltage controlled oscillators and synthesizers using the current Si-CMOS process. The drumhead capacitive switch 10 shown in FIG. 1 may be designed to produce a MEMS varactor. The voltage across the electrodes is varied to pull down and up membrane 22, which varies the distance $D_{air}$ between membrane 22 and dielectric 18, which changes the capacitance of the device 10 accordingly.

A problem in MEMS devices is stiction, which is the unintentional adhesion of MEMS device 10 surfaces. Stiction may arise from the strong interfacial adhesion present between contacting crystalline microstructure surfaces. The term stiction also has evolved to often include sticking problems such as contamination, friction driven adhesion, humidity driven capillary forces on oxide surface, and processing errors. Stiction is particularly a problem in current designs of MEMS varactors, due to the membrane 22 possibly adhering to dielectric 18, resulting in device 10 failure, either temporarily or permanently. To prevent stiction, material and physical parameters, and voltage signal levels of the varactor are designed to avoid contact of membrane 22 with dielectric 18. Coatings such as Teflon-like materials that resist stiction are frequently applied over dielectric 18.

SUMMARY OF THE INVENTION

The present invention achieves technical advantages as a MEMS varactor designed to operate in a stiction mode. The pull-down electrode or top membrane maintains contact with the underlying dielectric covering the bottom electrode during operation of the varactor. As the voltage across the pull-down electrode and the bottom electrode is varied, the area of the pull-down electrode contacting the dielectric is varied, which varies the capacitance.

Disclosed is a MEMS varactor, comprising a bottom electrode formed over a substrate, a dielectric material disposed over the bottom electrode, and a spacer proximate the bottom electrode. A pull-down electrode is disposed over the spacer and the dielectric material, wherein the varactor is adapted to operate in a stiction mode.

Also disclosed is a method of manufacturing a MEMS varactor, comprising depositing an insulator on a substrate, forming a bottom electrode on the insulator, and depositing a dielectric material over the bottom electrode. A spacer is formed over the insulator, and a pull-down electrode is formed over the spacer and the dielectric material, wherein the varactor is adapted to operate in a stiction mode.

Further disclosed is a method of operating a MEMS varactor, comprising applying a voltage across the bottom electrode and the pull-down electrode to produce a predetermined capacitance across the bottom and pull-down electrode, wherein at least a portion of the pull-down electrode is adapted to contact the dielectric material during operation in a stiction mode.

Advantages of the invention include solving the stiction problems of the prior art by providing a varactor adapted to operate in a stiction mode. The present MEMS varactor is a high Q varactor having a large tuning range. The distance between the dielectric and the membrane may be increased in accordance with the present invention, allowing for a larger tuning range and providing more sensitivity to a change in voltage. A wider range of voltages and capacitances is available with the present MEMS varactor design. Furthermore, the use of Teflon-like coatings on dielectric to prevent stiction of membrane is not required, as in some prior art designs. A wider variety of dielectric materials may be used for dielectric than in the prior art because there is no need for concern about stiction of the membrane to the dielectric. The invention provides an extended tuning range that is not possible with only an air gap for the capacitive medium.

BRIEF DESCRIPTION OF THE DRAWINGS

The above features of the present invention will be more clearly understood from consideration of the following descriptions in connection with accompanying drawings in which.

Corresponding numerals and symbols in the different figures refer to corresponding parts unless otherwise indicated.

DETAILED DESCRIPTION OF PREFERRED EMBODIMENTS

Figure 1:
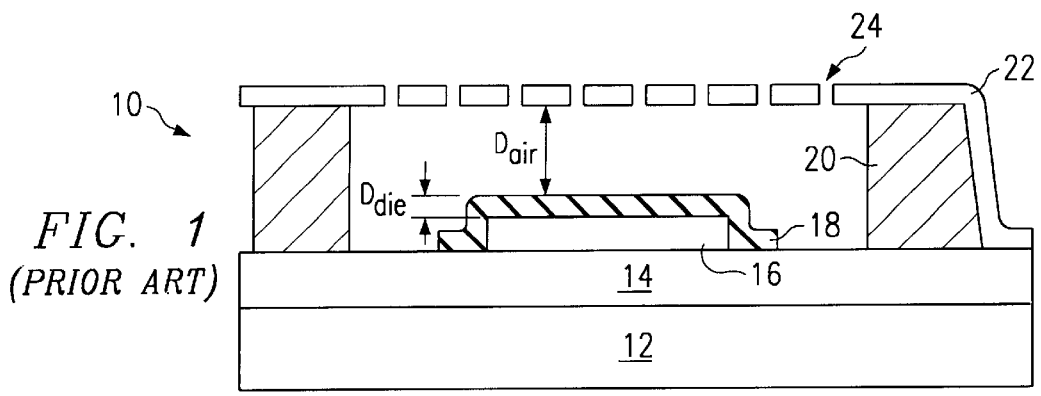
FIG. 1 illustrates a cross-sectional view of a prior art MEMS capacitive RF switch.
Figure 2:
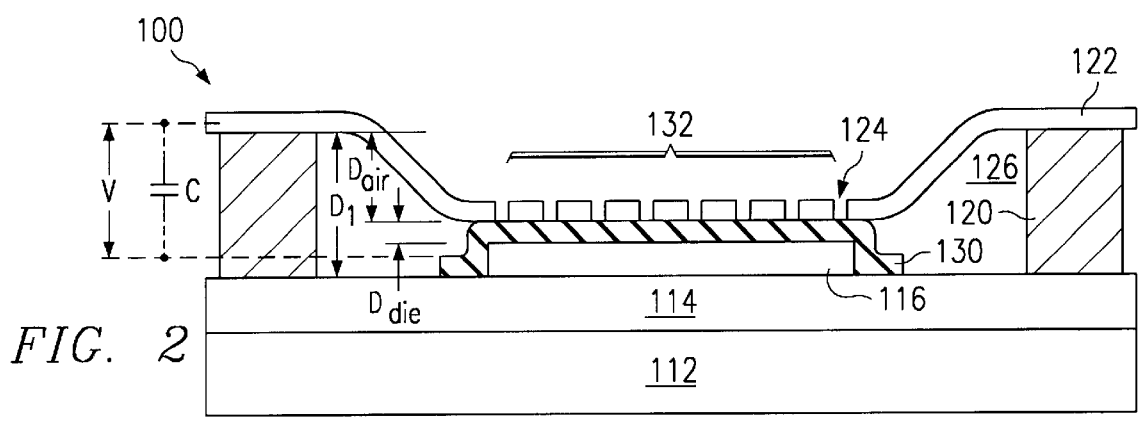
FIG. 2 illustrates a cross-sectional view of the MEMS varactor of the present invention adapted to operate in a stiction mode, with the majority of the membrane above the bottom electrode in contact with the dielectric.

A cross-sectional view of the MEMS varactor 100 of the present invention is shown in FIG. 2. MEMS varactor 100 comprises an insulator 114 deposited over a substrate 112, and a bottom electrode 116 formed on insulator 114. A dielectric 130 is formed over bottom electrode 116 to eliminate the possibility of electrode/electrode fusion and for creating a capacitance that is greater than possible with air. Spacer 120 are formed over the insulator 114 for supporting membrane 122 a distance $D_1$ above insulator 114. Distance $D_1$ may be, for example, 0.5–2.0 micrometers. Membrane 122 is also referred to herein as a pull-down electrode or top electrode. Membrane 122 may comprise holes 124 which are used to remove a temporary filler material (not shown) from cavity 126. Membrane 122 is movable through the application of a DC electrostatic field across membrane 122 and bottom electrode 116, similar to the operation of the MEMS RF switch 10 previously discussed.

The MEMS varactor 100 of the present invention is adapted to operate in a stiction mode. A stiction mode is defined herein as an active operating mode during which a voltage is applied across membrane 122 and bottom electrode 116, and the membrane 122 maintains contact with at least a portion of dielectric 130 covering bottom electrode 116.

The amount of area or portion 132 of membrane 122 that contacts dielectric material 130 is varied to change the capacitance C. The contact portion 132 is varied by changing voltage V across electrodes 122 and 116. In the stiction mode, the maximum capacitance $C_{max}$ is achieved when membrane 122 is biased with a voltage V such that membrane 122 makes complete contact at portion 132 to dielectric 130 as shown in FIG. 2. Capacitance $C_{max}$ may be expressed by Equation 2, $$C_{max} \approx \in_{die} A/D_{die} \qquad \text{Equation 2:}$$

where A is the cross-sectional area 132 of the electrode 122 in contact with dielectric 130, $\in_{die}$ is the dielectric constant of the dielectric 130 covering bottom electrode 116, and $D_{die}$ is the thickness of the dielectric 130. The capacitance is reduced by decreasing the membrane 122/dielectric 130 contact area, shown in FIGS. 6–8, which is accomplished by changing the voltage V. The relationship of capacitance C to area A, where A is varied by changing the voltage V, is a linear relationship. The minimum capacitance $C_{min}$, expressed in Equation 3, occurs when the membrane 122 is not contacting the dielectric 130, $$1/C_{min} \approx 1/(\in_{air} A/D_{air}) + 1/(\in_{die} A/D_{die}) \qquad \text{Equation 3:}$$

where $\in_{air}$ is the dielectric constant of the air and $D_{air}$ is the thickness of the air space between membrane 122 and top of dielectric 130. The tuning range TR is reflected by Equation 4:

$$TR = (C_{max} - C_{min})/C_{min} \times 100\% \qquad \text{Equation 4:}$$

The tuning range of the MEMS varactor may be extended or reduced by changing the material parameters, e.g. the materials of dielectric 130 and distances $D_{air}$ and $D_{die}$, of Equations 2 and 3, for example.

Figure 3:
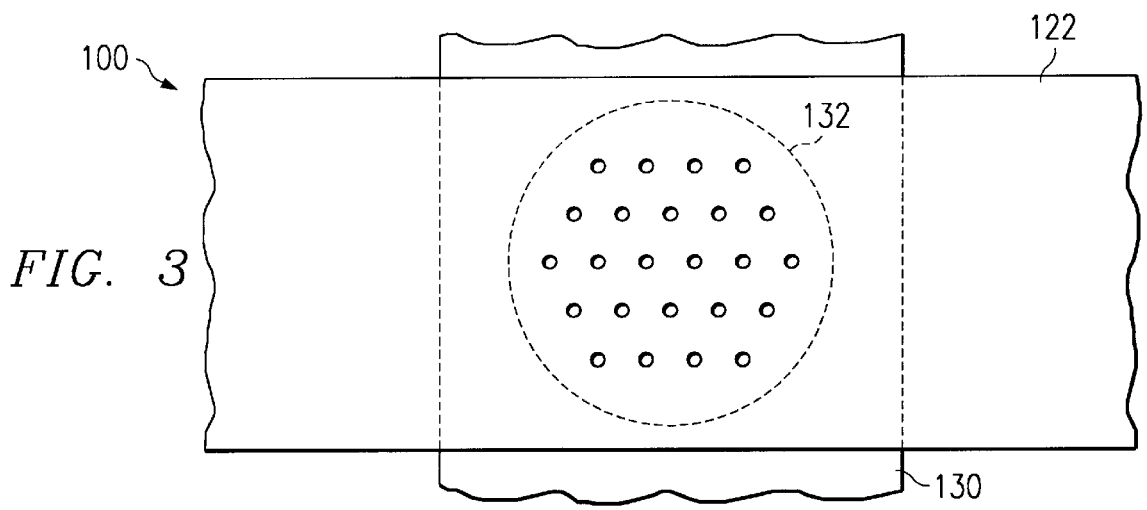
FIG. 3 illustrates a top view of the MEMS varactor shown in FIG. 2.
Figure 4:
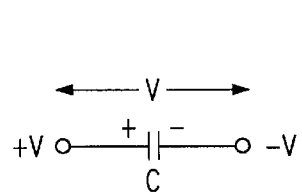
FIG. 4 shows a model schematic representation of the MEMS varactor having a capacitance across the membrane and the bottom electrode.
Figure 5:
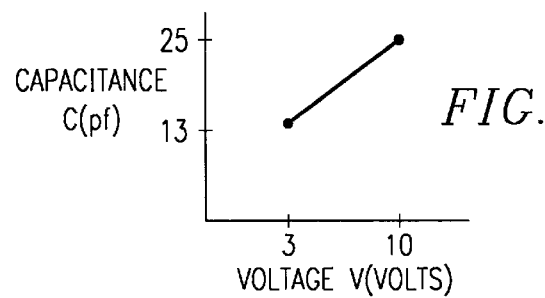
FIG. 5 illustrates a capacitance to voltage relationship of the MEMS varactor output capacitance over a range of voltages.
Figure 6:
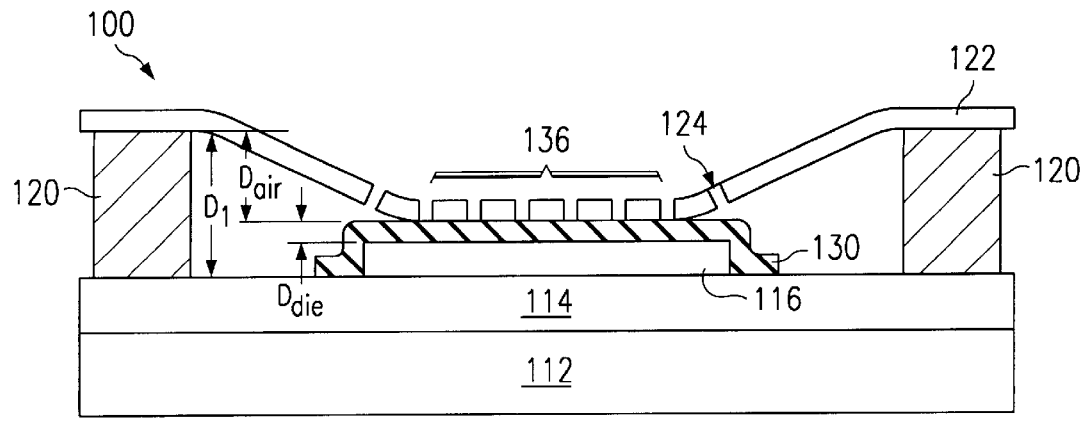
FIG. 6 illustrates a cross-sectional view of the present MEMS varactor with a portion of the membrane in contact with the dielectric.
Figure 7:
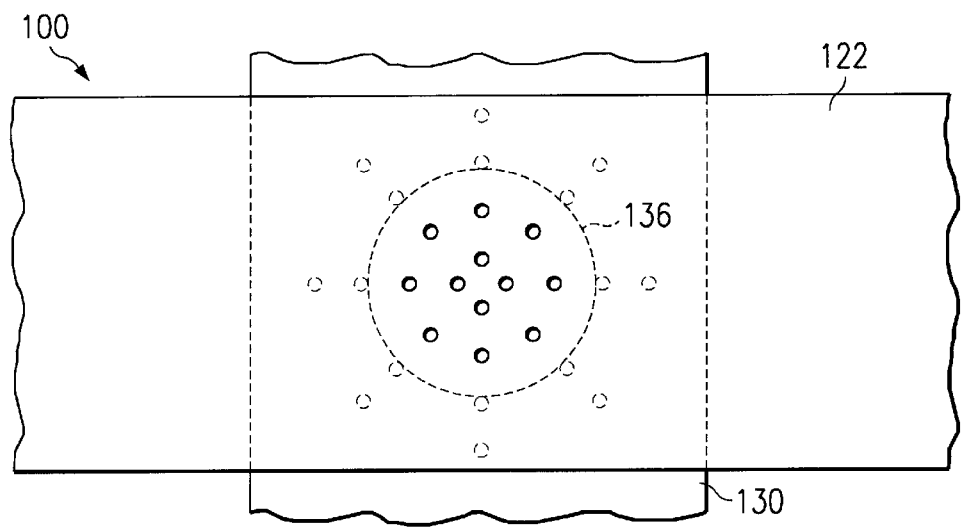
FIG. 7 illustrates a top view of the MEMS varactor shown in FIG. 6.
Figure 8:
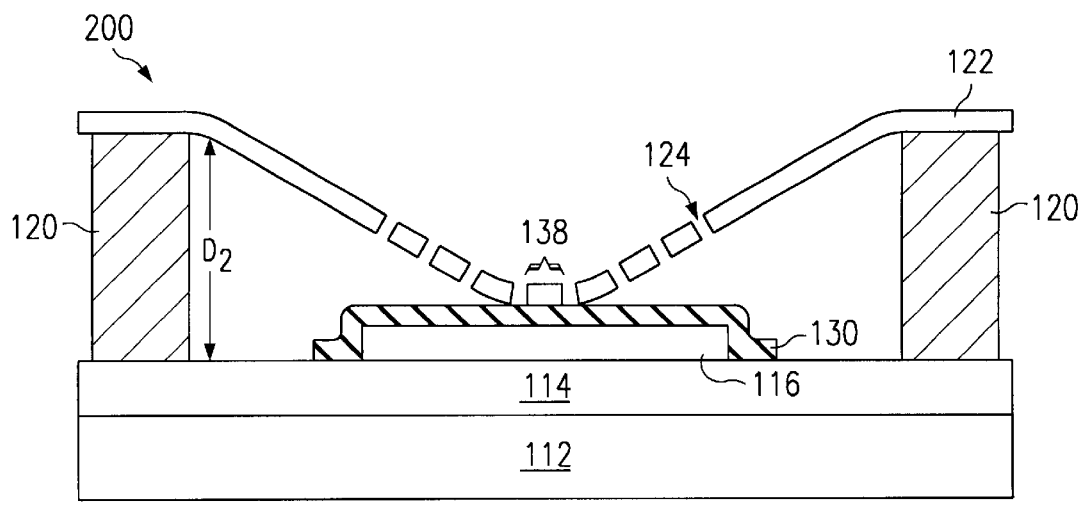
FIG. 8 illustrates a cross-sectional view of the present MEMS varactor with a minimal portion of the membrane in contact with the dielectric and having an increased spacer height, increasing the tuning range of the varactor.

FIG. 3 illustrates a top view of the MEMS varactor shown in FIG. 2, with a circular region 132 of membrane 122 in contact with dielectric 130 in a maximum amount, giving a maximum capacitance value $C_{max}$ for the varactor 100. FIG. 4 shows a model schematic representation of the MEMS varactor 100 having a capacitance C between the membrane 122 and the bottom electrode 116 for a voltage signal V input to either electrode 122, 116 of the varactor 100. FIG. 5 illustrates the capacitance to voltage relationship of the MEMS varactor 100 over a range of voltages, for example, a range of voltage signals from 3 to 10 volts produces a capacitance ranging from 13 to 25 pF in the stiction mode. These voltages and capacitances are exemplary and may vary with air gap distances $D_1$ and dielectric material properties. FIG. 6 illustrates a cross-sectional view of the present MEMS varactor with a portion 136 of membrane 122 in contact with dielectric 130, membrane portion 136 being smaller than membrane portion 132 shown in FIG. 2. FIG. 7 illustrates a top view of the MEMS varactor 100 shown in FIG. 2, with circular portion 136 of membrane 122 in contact with dielectric 130. FIG. 8 illustrates a cross-sectional view of an alternate embodiment of the present MEMS varactor 200 with a minimal portion 138 of membrane 122 in contact with dielectric 130 and having an increased spacer 120 height D$_2$, increasing the tuning range of the varactor 200. Increasing the distance D$_2$ to greater than 2 micrometers also provides more sensitivity to a change in voltage signal V.

There are many preferred and alternate configurations for the present varactor 100, 200 adapted to operate in a stiction mode. A first voltage signal applied across the bottom electrode and the pull-down electrode produces a first capacitance, and a second voltage signal applied across the bottom electrode and the pull-down electrode produces a second capacitance, where the first and second voltages are different.

Although preferably the pull-down electrode 122 maintains contact with the dielectric material 130 over a range of voltage signals, the varactor 100, 200 may also be operated in a non-stiction mode in an alternate embodiment. In this embodiment, the tuning range of the varactor may be increased if the membrane starts at the undeformed (no voltage signal applied) position and then is deflected so that it makes contact with bottom electrode. The height of the membrane is varied over the air gap until it makes contact partially, then fully with the bottom electrode. In this embodiment, a larger tuning range is achievable. However, the varactor may not be reliably operated across the entire tuning range if the membrane permanently sticks, in which case the varactor would then operate only in the stiction mode.

The invention also includes a method of manufacturing a MEMS varactor 100, 200 comprising depositing an insulator 114 on substrate 112, forming bottom electrode 116 on insulator 114 and depositing dielectric material 130 over bottom electrode 116. Spacer 120 are formed over insulator 114, and pull-down electrode 122 is formed over spacer 120 and dielectric material 130, wherein the varactor 100, 200 is adapted to operate in a stiction mode. At least a portion 132, 136, 138 of pull-down electrode 122 contacts dielectric material 130 in a stiction mode.

The invention also includes a method of operating a MEMS varactor 100, 200. The method comprises applying a voltage signal V across bottom electrode 116 and pull-down electrode 122 to produce a predetermined capacitance C across bottom 116 and pull-down 122 electrode, wherein at least a portion 132, 136, 138 of pull-down electrode 122 is adapted to contact dielectric material 130 during a stiction mode.

The novel MEMS varactor 100, 200 of the present invention achieves technical advantages by providing a high Q varactor having a large tuning range and increased sensitivity. MEMS varactor 100, 200 solves the stiction problems of prior art MEMS varactors by being adapted to operate in a stiction mode. The distance D$_1$, D$_2$ between the dielectric and the membrane may be increased in accordance with the present invention, allowing for a larger tuning range. A wider range of voltages and capacitances is available with the present MEMS varactor design compared with the prior art. Furthermore, the use of Teflon-like coatings on dielectric 130 to prevent stiction of membrane 122 is not required as in some prior art designs. A wider variety of dielectric materials may be used for dielectric 130 than in the prior art because there is no need for concern about stiction of the membrane 122 to the dielectric 130. The invention provides an extended tuning range that is not possible with only an air gap for the capacitive medium. Furthermore, the MEMS varactor 100, 200 preferably comprises silicon rather than GaAs, and may comprise metals that maintain low insertion loss and good isolation of the MEMS varactor 100, 200.

While the invention has been described with reference to illustrative embodiments, this description is not intended to be construed in a limiting sense. Various modifications in combinations of the illustrative embodiments, as well as other embodiments of the invention, will be apparent to persons skilled in the art upon reference to the description. For example, although membrane portions 132 and 136 in contact with dielectric 130 are shown in a top view as being circular, other shapes for contact membrane portion 132, 136 are anticipated, for example, square, oval rectangular, or any other geometrical shape. The MEMS varactor 100 may be designed to also operate in a non-stiction mode, wherein membrane 122 is not in contact with dielectric 130, as well as the stiction mode described herein. It is therefore intended that the appended claims encompass any such modifications or embodiments.

What is claimed is:

1. A Micro Electro-Mechanical System (MEMS) varactor, comprising:
   a bottom electrode formed over a substrate;
   a dielectric material disposed over said bottom electrode;
   a spacer Proximate said bottom electrode; and
   a pull-down electrode over said spacer and said dielectric material, wherein said MEMS varactor is adapted to operate in a stiction mode,
   wherein said pull-down electrode maintains contact with said dielectric material over a range of voltage signals, and
   wherein said range of voltage signals is from approximately 3 V to 10 V, wherein a capacitance in the range of 13 to 25 pF is produceable by said MEMS varactor in response to said range of voltage signals.

2. The MEMS varactor according to claim 1 wherein a first voltage signal applied across said bottom electrode and said pull-down electrode produces a first capacitance.

3. The MEMS varactor according to claim 2 wherein said a second voltage signal applied across said bottom electrode and said pull-down electrode produces a second capacitance.

4. The MEMS varactor according to claim 1 further comprising an insulating layer disposed over said substrate beneath said bottom electrode, wherein a distance D$_1$ is defined between said insulating layer and said pull-down electrode.

5. The MEMS varactor according to claim 4 wherein said distance D$_1$ is approximately 0.5–2.0 micrometers.

6. The MEMS varactor according to claim 4 wherein said distance D$_1$ is greater than 2.0 micrometers.

7. The MEMS varactor according to claim 4 wherein said distance D$_1$ is approximately 0.5–2.0 micrometers.

8. The MEMS varactor according to claim 4 wherein said distance D$_1$ is greater than 2 micrometers.

9. A Micro Electro-Mechanical System (MEMS) varactor, comprising:
   a bottom electrode formed over a substrate;
   a dielectric material disposed over said bottom electrode;
   a spacer proximate said bottom electrode; and
   a pull-down electrode over said spacer and said dielectric material, wherein said MEMS varactor is adapted to operate in a stiction mode, wherein a voltage signal applied across said bottom electrode and said pull-down electrode produces a capacitance,
   wherein said pull-down electrode maintains contact with said dielectric material over a range of voltage signals in said stiction mode, and
   wherein said range of voltage signals is from approximately 3 V to 10 V, wherein a capacitance in the range of 13 to 25 pF is produceable by said MEMS varactor in response to said range of voltage signals.

10. The MEMS varactor according to claim 9 further comprising an insulating layer disposed over said substrate beneath said bottom electrode, wherein a distance $D_1$ is defined between said insulating layer and said pull-down electrode.

11. The MEMS varactor according to claim 10 wherein said distance $D_1$ is approximately 0.5–2.0 micrometers.

12. The MEMS varactor according to claim 10 wherein said distance $D_1$ is greater than 2.0 micrometers.

13. A method of operating a MEMS varactor having a bottom electrode formed on a substrate, a dielectric material disposed over the bottom electrode, a spacer formed on the substrate supporting a pull-down electrode, wherein a voltage applied across the bottom electrode and the pull-down electrode responsively changes the capacitance of the varactor, comprising:

applying a voltage signal across the bottom electrode and the pull-down electrode to produce a Predetermined capacitance across said bottom and pull-down electrode, wherein at least a portion of said pull-down electrode is adapted to contact said dielectric material during a stiction mode, wherein said applying a voltage signal comprises applying a voltage of approximately 3 V to 10 V to produce a varactor capacitance in the range of 13 to 25 pF.

14. The method according to claim 13 wherein the area of said pull-down electrode portion in contact with said dielectric material varies responsively to changes in said voltage signal.

* * * * *